United States Patent Office 2,831,867
Patented Apr. 22, 1958

2,831,867

PROCESS FOR PRODUCING α-PHENYL SUCCINIMIDES

Charles A. Miller, Detroit, Mich., assignor to Parke, Davis & Company, Detroit, Mich., a corporation of Michigan No Drawing. Application May 2, 1955
Serial No. 505,512

9 Claims. (Cl. 260—326.5)

This invention relates to a process for producing α-phenylsuccinimides. More particularly, the invention relates to a process for producting N-methyl-α-phenyl-succinimide.

N-methyl-α-phenylsuccinimide has recently become a very valuable product for the treatment of petit mal epilepsy. According to United States Patent No. 2,643,258 this product can be prepared from phenylsuccinic acid or phenylsuccinic anhydride by reaction with methylamine and heating the resultant product. However, the process suffers the disadvantage that it requires the use of phenylsuccinic acid or phenylsuccinic anhydride both of which are quite expensive starting materials.

It is an object of the present invention to provide a process for producing N-methyl-α-phenylsuccinimide from readily available cheap starting materials.

In accordance with the invention this object as well as others which will appear hereinafter are realized by reacting phenylmaleic anhydride with methylamine at a temperature between 80 and 110° C. thereby producing N-methyl-α-phenylmaleimide and then reducing the aliphatic double bond present in the N-methyl-α-phenyl-maleimide.

In carrying out the reaction between the phenylmaleic anhydride and the methylamine, one equivalent, and preferably a slight excess, of the methylamine is employed. The reaction can be carried out in water, an organic solvent or a mixture of water and a water-miscible organic solvent. Suitable solvents other than water include lower aliphatic alcohols such as methanol, ethanol and isopropanol, cyclic ethers such as dioxane, esters such as ethyl acetate, aqueous mixtures of the aforementioned substances and the like. From the standpoint of cost the preferred solvent is water. The preferred temperature for carrying out the reaction is 95-100° C. The reaction is quite rapid and is usually complete within a half an hour to two hours.

The reduction of the aliphatic double bond in the N-methyl-α-phenylmaleimide is preferably carried out using gaseous hydrogen and a metal hydrogenation catalyst. As hydrogenation catalysts, Raney nickel and the noble metal catalysts such as platinum oxide give particularly good results. The reduction can be carried out at temperatures between 15 and 100° C. The pressure of the gaseous hydrogen is not particularly critical and can be varied anywhere from one atmosphere to a hundred or more. Good results are obtained with hydrogen pressures of about 2½ to 6 atmospheres and consequently there is no need to employ greater pressures. As solvents, esters such as ethyl acetate, lower aliphatic alcohols such as methanol, ethanol, isopropanol and mixtures of esters and lower aliphatic alcohols are preferred.

The invention is illustrated by the following example.

Example

A mixture consisting of 4 g. of phenylmaleic anhydride and 3.5 ml. of 23% aqueous methylamine is heated on a steam bath for one hour. 10 ml. of cold water is added, the mixture cooled and the desired N-methyl-α-phenyl-maleimide collected by filtration; yield 2 g.; M. P. 145–147° C.

100 mg. of platinum oxide hydrogenation catalyst is added to a solution of 4 g. of N-methyl-α-phenylmaleimide in 100 ml. of absolute ethanol and 100 ml. of ethyl acetate. The mixture is shaken in a closed vessel with gaseous hydrogen under a pressure of 49 lbs. per sq. inch until the theoretical amount of hydrogen is absorbed. The vessel is vented, the catalyst removed by filtration and the filtrate concentrated to a volume of about 15 ml. The residual liquid is filtered, the filtrate cooled and the desired N-methyl-α-phenylsuccinimide collected; yield 3 g.; M. P. 70–72° C.

If desired, the 100 mg. of platinum oxide catalyst used in the above procedure can be replaced with about 0.5 g. of Raney nickel catalyst.

The phenylmaleic anhydride used as one of the starting materials in the practice of the invention can be prepared cheaply and easily by the interaction of maleic anhydride, benzene and chlorine in the presence of ultraviolet light.

What I claim is:

1. Process for the production of N-methyl-α-phenyl-succinimide which comprises reacting phenylmaleic anhydride with methylamine at a temperature between 80 and 110° C. and subjecting the N-methyl-α-phenylmaleimide so produced to the action of a reducing agent for the aliphatic double bond.

2. Process for the production of N-methyl-α-phenyl-succinimide which comprises reacting phenylmaleic anhydride with slightly more than one equivalent of methylamine at a temperature between 80 and 110° C. in an aqueous reaction medium, separating the N-methyl-α-phenylmaleimide so produced and subjecting the N-methyl-α-phenylmaleimide to the action of gaseous hydrogen in the presence of a metal hydrogenation catalyst.

3. Process for the production of N-methyl-α-phenyl-succinimide which comprises reacting phenylmaleic anhydride with slightly more than one equivalent of methylamine at a temperature between 80 and 110° C. in an aqueous reaction medium, separating the N-methyl-α-phenylmaleimide so produced and subjecting the N-methyl-α-phenylmaleimide to the action of gaseous hydrogen at a pressure between 2½ and 6 atmospheres and a temperature between 15 and 100° C. in the presence of a noble metal hydrogenation catalyst.

4. Process for the production of N-methyl-α-phenyl-succinimide which comprises reacting phenylmaleic anhydride with slightly more than one equivalent of methylamine at a temperature between 80 and 110° C. in an aqueous reaction medium, separating the N-methyl-α-phenylmaleimide so produced and subjecting the N-methyl-α-phenylmaleimide to the action of gaseous hydrogen at a pressure between 2½ and 6 atmospheres and a temperature between 15 and 100° C. in the presence of Raney nickel hydrogenation catalyst.

5. Process for the production of N-methyl-α-phenyl-succinimide which comprises reacting phenylmaleic anhydride with methylamine at a temperature between 80 and 110° C., and subjecting the N-methyl-α-phenylmaleimide to the action of gaseous hydrogen in the presence of a metal hydrogenation catalyst.

6. Process according to claim 5 in which the catalyst is selected from the class consisting of Raney nickel and the noble metal catalysts.

7. Process according to claim 5 in which the catalyst is Raney nickel.

8. Process according to claim 5 in which the catalyst is platinum oxide.

9. Process for the production of N-methyl-α-phenylsuccinimide which comprises subjecting N-methyl-α-phenylmaleimide to the action of gaseous hydrogen in the presence of a metal hydrogenation catalyst.

References Cited in the file of this patent
UNITED STATES PATENTS 2,205,558   Flett _____ June 25, 1940

OTHER REFERENCES

Sakurai: Chem. Abstracts, vol 31, column 3393 (1937).